Figure 1:
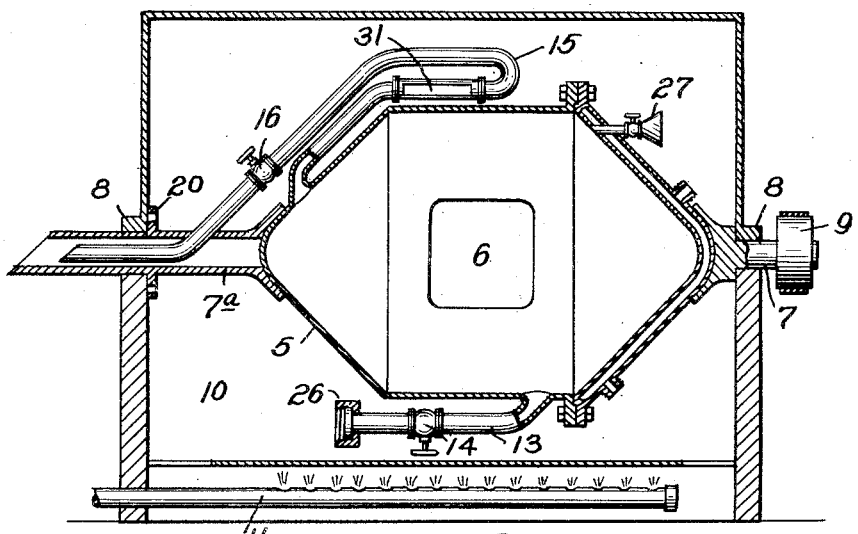

H. ANHALTZER.
METHOD OF MAKING SOLUBLE COFFEE.
APPLICATION FILED NOV. 9, 1918.

1,365,443.

Patented Jan. 11, 1921.
2 SHEETS—SHEET 1.

WITNESSES
J. Herbert Bradley

INVENTOR
Henry Anhaltzer
By Fred'k W. Winter
Attorney

H. ANHALTZER.
METHOD OF MAKING SOLUBLE COFFEE.
APPLICATION FILED NOV. 9, 1918.

1,365,443.

Patented Jan. 11, 1921.
2 SHEETS—SHEET 2.

WITNESSES
J. Herbert Bradley.

INVENTOR
Henry Anhaltzer
By Fredk W. White,
Attorney.

UNITED STATES PATENT OFFICE.

HENRY ANHALTZER, OF PITTSBURGH, PENNSYLVANIA.

METHOD OF MAKING SOLUBLE COFFEE.

1,365,443.  Specification of Letters Patent.  Patented Jan. 11, 1921.

Application filed November 9, 1918. Serial No. 261,898.

*To all whom it may concern:*

Be it known that I, HENRY ANHALTZER, a resident of Pittsburgh, in the county of Allegheny and State of Pennsylvania, have invented a new and useful Improvement in Methods of Making Soluble Coffee, of which the following is a specification.

This invention relates to a method of treating coffee beans to extract the soluble constituents thereof and separate the same from the insoluble and fibrous parts and form from the soluble constituents a readily soluble solid concentrate, either in the form of a powder, but preferably compressed into tablets, from which a beverage can be prepared for instant use by dissolving the same in either cold or hot water or milk, without boiling, said concentrate retaining and the beverage having all of the natural aroma and taste of freshly prepared coffee made from freshly roasted and ground coffee in the usual way by percolation.

The coffee bean, aside from other constituents, contains a highly volatile oil, called coffeon, or coffeol, to which the aroma of coffee is due. This highly volatile oil diffuses on protracted boiling. It is well known that when ground coffee is boiled in or percolated with water and the liquid so formed is evaporated to dryness, there remains a solid residue which can be readily dissolved again and forms so-called black coffee. Due however to the volatile nature of the coffeon or coffeol, and since it takes considerable time to evaporate the coffee extract, this volatile oil escapes and therefore the coffee prepared from such concentrate is devoid of the aroma and taste of freshly prepared coffee. This is the case even if the coffee extract is evaporated in a vacuum pan.

The special object of the present invention is to provide a method of treating the roasted coffee bean and forming the soluble solid concentrate, in a manner to retain all of the natural aroma and taste of freshly roasted and ground coffee. A further object is to provide a method for forming such concentrate which can be economically carried out, on a large scale, and practically without loss of the re-agents employed. Other objects of the method will become apparent from the description thereof hereinafter following:

For the attainment of the foregoing objects the soluble constituents of the coffee bean are not extracted by the use of water, but by a more readily volatile liquid, for instance ethyl alcohol (grain alcohol), the boiling point of which under ordinary atmospheric pressure is 78.3° centigrade, and carrying out the evaporation of the extract of the coffee in this volatile liquid in a vacuum of such degree that the volatile liquid will evaporate at a greatly reduced temperature, thereby securing a very rapid evaporation of the extract and, further, introducing the alcoholic extract into the vacuum pan in the form of fine sprays, so that the liquid is separated from the solid almost immediately, and the latter converted into solid particles before they reach the bottom of the vacuum pan; the extraction and the evaporation being carried out in vessels hermetically sealed from the atmosphere, so that the volatile oils of the coffee bean are not carried off by the air but are retained in the solid concentrate of the extract.

Figure 2:
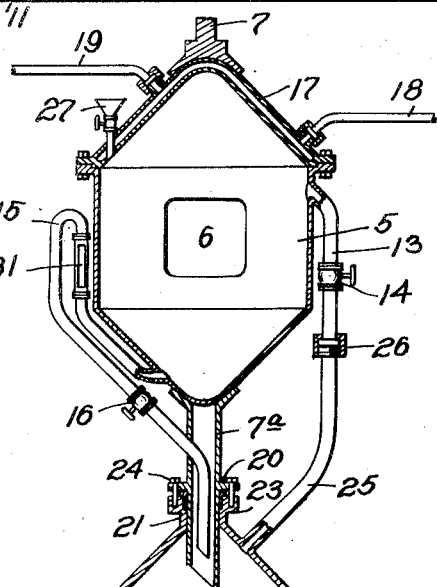
Figure 3:
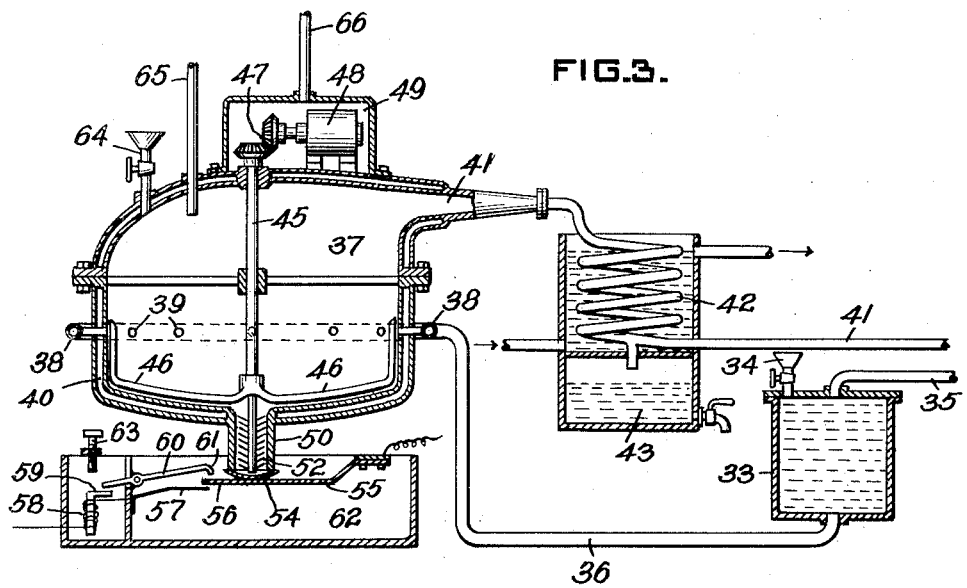
Figure 4:
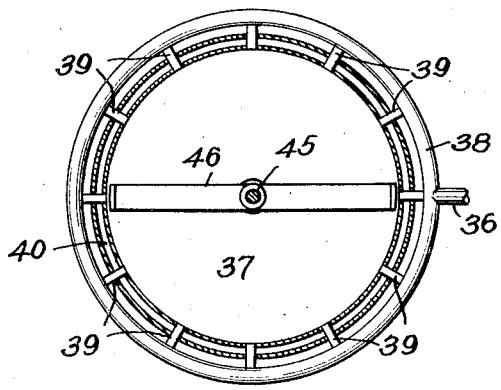
Figure 5:
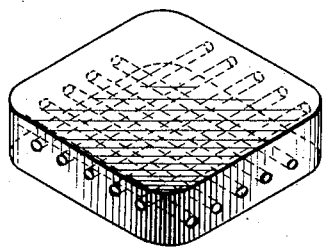

The accompanying drawings illustrate simple forms of apparatus by means of which the method can be carried out, but it is understood that these are merely illustrative and are not intended to show the complete arrangement of apparatus by which the method will be carried out commercially on a large scale. In said drawings, Figure 1 is a sectional view of suitable apparatus for "steaming" the ground roasted coffee bean to loosen the soluble constituents thereof; Fig. 2 is a sectional view of suitable apparatus for extracting said soluble constituents from the insoluble and fibrous portion of the coffee bean; Fig. 3 is a diagrammatic sectional view illustrating suitable apparatus for evaporating the extract to separate out the solid concentrate and recover the re-agent; Fig. 4 is a horizontal section therethrough on the line 4—4, Fig. 3; and Fig. 5 illustrates one form of tablet of the solid concentrate.

In carrying out the method the roasted coffee beans are ground reasonably fine, the finer the better, and are then placed in a suitable textile bag, preferably of linen or cotton, which is placed in a suitable vessel together with a small quantity of water, after which the vessel is hermetically sealed and the whole subjected to heat. A suitable vessel for this purpose is indicated by the reference numeral 5, Fig. 1, the same being provided with a door or man-hole 6, through which the ground coffee, and water, can be introduced, and which can then be hermetically sealed; and also with axes or trunnions 7, 7ª at its ends arranged to be mounted in suitable bearings 8 in which the vessel can be rotated by any suitable means, such as by attaching a belt pulley 9 or the like to one of the trunnions. This vessel, hermetically sealed, and containing the ground coffee and a small quantity of water is subjected to heat, preferably by means of a hot air bath, or otherwise, out of contact with the flame, to 105° centigrade, for a period of not more than thirty minutes. This can be conveniently done by inclosing the vessel in a suitable oven or chamber 10 to which heat is applied in any suitable way, such as by a gas burner 11, and in which the vessel is slowly rotated while being subjected to heat so as to secure uniform heat throughout, and out of contact with the flame.

The amount of water introduced is only sufficient to moisten the coffee, and preferably is equal in weight to that of the ground coffee used. The treatment in this "steamer" at the temperature specified causes the water to be converted into moist steam and this results in loosening all of the soluble constituents of the coffee, and especially the volatile oils which impart the aroma and taste, and since this step is carried out in a hermetically sealed vessel, without the circulation of air therethrough, there is no chance for the oils to escape, but they remain imprisoned.

This part of the process can also be effected by directly subjecting the ground coffee to a jet of live steam, but the method above described is preferred as being simpler and safer.

The vessel above described is also provided with two connections, one thereof, 13, opening into the vessel near one end and being adapted to be closed by means of a cock or valve 14; while the other thereof 15 opens into the opposite end of the vessel and then extends toward the first named end and is curved on itself, as shown, forming a siphon tube and having its free end extending into the trunnion 7ª, which is formed hollow as shown. This pipe is provided with a cock or valve 16. The top of the vessel, that is, the end opposite that to which the siphon pipe 15 is connected, is water jacketed, as shown at 17, and provided with a water inlet 18 and a water outlet 19. The hollow trunnion 7ª has also secured to it a flange 20.

After the ground coffee has been "steamed" with a small quantity of water, as above described, it is thoroughly cooled, either artificially or in the air, and said vessel is then taken and its hollow trunnion 7ª is inserted into the neck 21 of a suitable "boiler" 22, the neck of said boiler being provided with a flange 23 to which the flange 20 of the steamer is connected by suitable compression bolts 24, and in a manner to make a hermetically sealed joint. The boiler is provided with an outlet pipe 25 which will be connected to the pipe 13 of the steamer, by a suitable union 26 arranged to make a hermetically sealed joint.

A suitable volatile liquid, preferably ethyl alcohol, is introduced into the steamer through a filling cock 27, sufficient to fill the space in said steamer a little more than half full, preferably about one hundred parts of alcohol to each fifteen parts of coffee. Alcohol is also introduced into the boiler 22, less than half full, the total quantity of alcohol being a little more than enough so that when all is introduced into the vessel 5 it will fill the same slightly above the upper bend of the siphon pipe 15. The boiler 22 is then inserted in a suitable water bath, contained in a vessel 29, to which heat will be applied in any suitable way, such as by means of an exterior burner 30, or if desired by an internal steam coil. By means of this water bath the boiler is heated to about 85° centigrade or less. At this temperature the alcohol will boil and its vapor rises through the tubes or pipes 25, 13, and enters the vessel 5, and comes into contact with the water cooled top 17 of said vessel and is thereby condensed to liquid form and penetrates the coffee in the bag in said vessel, and extracts therefrom the loosened soluble constituents, and forms a dark liquid, which is coffee extract. This continues until the alcohol has accumulated in the vessel 5 in sufficient quantity to reach the upper bend of the siphon tube 15. When this level is reached the accumulated alcohol coffee extract is automatically siphoned out of the vessel 5 into the boiler 22, carrying with it a large part of the loosened soluble constituents. This returned alcohol is again evaporated by the hot water bath and again rises into the vessel 5, is condensed therein, and again percolates the coffee, and this will continue until the level of the alcohol in the vessel 5 again reaches the level of the upper part of the siphon tube 15, when it is again automatically siphoned out of said vessel and returned to boiler 22. This is continued until the alcoholic liquid siphoned back into the boiler 22 is quite colorless which indicates that the soluble constituents of the coffee are totally extracted. For this purpose the siphon tube 15 is provided with a glass section 31 through which the alcohol extracted is visible. This extraction also occurs in hermetically sealed apparatus out of contact with the air so that no aroma is therein lost.

Although alcohol has no extractive property on coffee, nevertheless it does extract the soluble constituents because these have previously been loosened by the steaming which forms the preliminary step of the process, and since water is miscible with alcohol in all proportions, it is obvious that the soluble coffee constituents will be extracted by the alcohol although the latter is present in about six and a half times the volume of the water which was added. This method of extracting the soluble constituents has another advantage, namely that the coffee extract or liquid need not be filtered, because the alcohol comes down into the boiler clear and free from solid constituents, although very dark. For the sake of safety however it is preferred, after the extraction is completed, to connect the boiler 22 to a suitable revolving machine or centrifuge whereby any solids that accidentally come down with the alcohol, will be deposited on the bottom of the boiler and the liquid will be rendered crystal clear, without exposure to the air as would be the case with ordinary filtration.

Alcohol is preferred as the solvent for extracting the soluble constituents of the coffee because it will dissolve more of said constituents than any other ordinary liquid which will evaporate at a low temperature. Other solvents, however, capable of dissolving one or more of the desired soluble constituents of the coffee, or combinations of such solvents, may be used. For instance, ether, as hereinafter appears is a solvent of some of the constituents of coffee. Likewise chloroform is a solvent of some of the constituents of coffee. Either or both of these may be used in lieu of the alcohol, or together with alcohol.

The coffee extract thus formed is then evaporated. One way of doing this is by withdrawing the extract from the boiler 22 and introducing it into a suitable reservoir 33, through a suitable filling cock 34 therein, and then forcing the liquid from said vessel, preferably by air pressure introduced through pipe 35, through pipe 36 into the evaporating vessel or pan 37. Preferably the pipe 36 connects with an annular pipe 38 extending around the evaporating vessel 37 and connecting with the interior thereof through a series of nozzles 39 which inject the extract into the lower part of the vacuum vessel in the form of sprays. The vessel 37 is heated in any suitable way, such as providing the same with a steam jacket 40. Leading from the upper part of the vacuum vessel is an outlet pipe 41 connected to any suitable suction source, by means of which the atmospheric pressure in the vessel 37 is reduced to such degree that the liquid spray entering the vessel is evaporated at such a speed that the solid constituents of the coffee extract drop to the bottom of the vessel 37 as a solid powder, the speed being such that there is not time for the solid constituents to lose the volatile oils, or at least only a very little thereof, and in fact much less than when coffee is prepared in the ordinary way in a percolator.

The alcohol vapors withdrawn from the vessel 37 are recovered by introducing into the outlet a suitable condenser, diagrammatically shown as a water cooled coil 42 provided with a liquid outlet leading to an alcohol storage tank 43. In this way substantially all of the alcohol is recovered.

If the solid particles were allowed to remain in the bottom of the vessel 37 for an undue time the constant withdrawal of the alcohol vapors from said vessel would carry away a certain amount of the volatile oils and thus reduce the aroma of the coffee particles. In order to avoid this, the vacuum vessel is provided with a mechanical stirrer, comprising a vertical shaft 45 rotatably mounted at the axis of the vessel and provided with a pair of arms 46 shaped to the curvature or form of the bottom of the vessel 37, and which shaft is rotated by suitable means, such as miter gears 47 driven from any suitable source, such as electric motor 48 inclosed in a chamber 49 on top of the vessel 37 and hermetically sealed therein. The revolution of shaft 45 causes the arms 46 to dislodge the dry coffee particles from the bottom of the vessel and to move them to the center of the cone-shaped bottom of the said vessel, to the axial outlet pipe 50.

The warm moist condition in the vessel 37 has a tendency to cause the particles to cling together, and to avoid this the lower end of the shaft 45 is provided with a brush 52, preferably formed of narrow gold or silver plated stiff metal strips attached to the end of the shaft, and which in the rotation of the shaft agitates the coffee particles and prevents them from adhering to each other and clogging the outlet.

The outlet 50 gradually becomes filled with the coffee particles, and I preferably provide means for automatically discharging the same therefrom from time to time. To this end the lower end of the discharge pipe 50 is closed by means of a convex disk or valve 54 which is held in position to close the mouth of the discharge pipe by means of spring 55, whose length and strength are such as to sustain only a pre-determined weight, say one pound, a half pound, or any other suitable weight. When the weight of the accumulated coffee particles exceeds the pre-determined weight this valve is forced downwardly and the end 56 of spring 55 makes contact with another spring 57. Both springs are connected in a suitable electric circuit, which is thereby closed, thus closing the circuit to a suitable electric motor (a solenoid 58, which is in effect a reciprocating electric motor), which, upon the circuit being closed, is set into action, and its core or armature is lifted, and through lifting arm 59 connected thereto comes in contact with the end of a pivoted lever 60 having a bent end 61 arranged to contact with the end of the spring 55, thus forcing the disk or valve 54 downwardly and opening the mouth of the discharge pipe 50 and releasing the accumulated coffee particles which drop down into the receiving chamber 62. When thus relieved from its load the disk or valve is again automatically lifted by the spring 55 to close the discharge opening from the vessel 37. In this way the accumulated solid coffee particles are automatically removed, at short intervals, from the evaporating vessel 37.

A stop 63 is arranged to limit the upward travel of the lifting arm on the motor or armature, and when the disk or valve is again returned to its original position the contact between the projecting end 56 of spring 55 and spring 57 is broken, the electric circuit is thereby broken, and the motor remains inactive until the valve is again pressed down by a new accumulation of solid coffee particles.

The vacuum vessel 37 is preferably provided with an emergency feed tube 64 through which the coffee extract can be introduced by means of a dropping funnel in small droplets. This is intended to be used in case of some mechanical trouble which prevents the introduction of the coffee extract through the spray nozzles 39. The top of the vessel 37 is also provided with a thermometer tube 65 and manometer connection 66.

The evaporation, it will be observed, is carried out without substantial contact of the coffee extract with air, and the evaporation is effected with such speed, and the solid coffee particles are removed from the evaporating vessel at such short intervals, that there is practically no loss of the volatile oils which impart the aroma and taste to the coffee. The alcohol used for the extraction is recovered, and can be used over and over again with only slight loss. In time the alcohol will become too diluted (by reason of taking up each time a small amount of the water with which the coffee is initially steamed) to be serviceable, but it can be dried over calcium oxid or other suitable dehydrating agent and rectified in the manner well known to distillers. Thus there is practically no loss of re-agent, which makes the process very economical.

The method can be carried out on a large scale, as is perfectly obvious, and it requires far less time than the prior methods of forming such coffee concentrates, all of which leads to economy. Furthermore, the full aroma and taste of the coffee is retained so that the resulting product is the finest and purest that is possible.

The solid coffee concentrate is perfectly soluble in either hot or cold water or milk, and can be used in powdered form or compressed into tablets of such size that each tablet will produce a cup of coffee. These can be easily packed in air and moisture-proof wrappings of oiled paper and tinfoil and put up in cans or cartons of sizes which can be readily transported or carried.

To facilitate dissolving the tablets I prefer to insert into the mold in which the tablets are formed, several silver or other metal wires, preferably crosswise, and around which the powder is compressed to form the tablet, after which the wires are withdrawn, thus leaving several crosswise channels in the interior of the tablet into which the hot water will enter and thereby hasten the dissolution of the tablet. One form of such tablet is illustrated in Fig. 5.

In the practice of the method above described, neither the coffee while steaming, nor the liquid extracted therefrom is ever exposed to the air, thus not only preventing a loss of volatile oils but also preventing contact with dust and contaminating agents, and is never touched by the hands so that the product is pure and sanitary.

The process may be varied by first treating the ground roasted coffee bean, or at least portions thereof, prior to steaming, with ethyl ether (sulfuric ether) which dissolves out the coffeon. The ethyl ether is distilled off and used over again, and the coffee after treatment with the ethyl ether is subjected to the process above described, to produce powdered coffee concentrate, over which the coffeon extracted by the ethyl ether is sprayed. A very small amount of oil is sufficient to impart the natural aroma of coffee to a very large volume of water, so that when the tablet or powder is dissolved in hot water the beverage will absolutely be of the same quality of freshly prepared coffee.

I claim:

1. The method of forming a coffee concentrate, which consists in treating roasted coffee beans with aqueous vapor to loosen the soluble constituents thereof while retaining the volatile constituents, said treatment being carried on out of contact with the air, treating the steamed coffee with a volatile liquid capable of extracting the soluble constituents of coffee to thereby form a liquid coffee extract, and evaporating said extract and forming a solid coffee concentrate.

2. The method of forming a coffee concentrate, which consists in treating roasted ground coffee beans with aqueous vapor to loosen the soluble constituents thereof while retaining the volatile constituents, treating the steamed coffee with a volatile liquid capable of extracting the soluble constituents of coffee to thereby form a liquid extract, and evaporating said extract and forming a solid coffee extract, said treatments being carried on out of contact with the air to retain the volatile oils.

3. The method of forming a coffee concentrate, which consists in treating roasted ground coffee beans with aqueous vapor to loosen the soluble constituents thereof while retaining the volatile constituents, said treatment being carried on out of contact with the air, treating the steamed coffee with ethyl alcohol to extract the soluble constituents and form a liquid coffee extract, and distilling said liquid extract and forming a solid coffee concentrate.

4. The method of forming a coffee concentrate, which consists in treating roasted ground coffee beans with aqueous vapor to loosen the soluble constituents thereof while retaining the volatile constituents, treating the steamed coffee with ethyl alcohol to extract the soluble constituents and form a liquid coffee extract, and distilling said liquid extract and forming a solid coffee concentrate, all of said steps being carried on out of contact with the air, whereby loss of volatile oils is avoided.

5. The method of forming a soluble coffee concentrate, which consists in treating roasted ground coffee beans with aqueous vapor to loosen the soluble constituents thereof while retaining the volatile constituents, said treatment being carried on out of contact with the air, treating the steamed coffee with a volatile liquid capable of extracting the soluble constituents of coffee to thereby form a liquid coffee extract, and rapidly evaporating said extract in a vacuum and forming a solid coffee concentrate.

6. The method of forming a soluble coffee concentrate, which consists in treating roasted ground coffee beans with aqueous vapor to loosen the soluble constituents thereof while retaining the volatile constituents, treating the steamed coffee with a volatile liquid capable of extracting the soluble constituents of coffee to thereby form a liquid coffee extract, and rapidly evaporating said extract in a vacuum and forming a solid coffee concentrate, all of said steps being carried on out of contact with the air, whereby the loss of volatile oils is avoided.

7. The method of forming soluble coffee concentrate, which consists in treating roasted coffee beans with aqueous vapor to loosen the soluble constituents thereof while retaining the volatile constituents, said treatment being carried on out of contact with the air, treating the steamed coffee with ethyl alcohol to extract the soluble constituents and form a liquid coffee extract, evaporating said extract and forming solid coffee concentrate, and finally forming said concentrate into tablets.

8. The method of forming soluble coffee concentrate, which consists in treating roasted ground coffee beans with ethyl ether to dissolve the volatile oil therefrom, removing the oil from the solution, treating the ground coffee out of contact with the air with aqueous vapor to loosen the solid constituents thereof, treating the steamed coffee with a volatile liquid capable of extracting the soluble constituents of coffee to thereby form a liquid coffee extract, evaporating said extract and forming a solid coffee concentrate, and adding at least a part of the volatile oil to said concentrate.

9. The method of forming a coffee extract, which consists in moistening roasted coffee beans with a small quantity of water, heating the same out of contact with the air to convert the water into aqueous vapor and thereby loosen the soluble constituents of the coffee while retaining the volatile constituents thereof, and then, without exposing the same to air, treating the coffee with a volatile liquid capable of extracting the soluble constituents of the coffee, thereby forming a liquid coffee extract.

10. The method of forming a coffee extract, which consists in moistening roasted coffee beans with a small quantity of water, heating the same out of contact with the air to convert the water into aqueous vapor, and thereby loosen the soluble constituents of the coffee while retaining the volatile constituents thereof, cooling the same, and then treating the coffee, out of contact with the air, with a volatile liquid capable of extracting the soluble constituents of the coffee, and thereby forming liquid coffee extract.

In testimony whereof I have hereunto set my hand.

HENRY ANHALTZER.

Witness:
G. G. TRILL.